US011600266B2

(12) United States Patent
Yong

(10) Patent No.: US 11,600,266 B2
(45) Date of Patent: Mar. 7, 2023

(54) NETWORK-BASED LEARNING MODELS FOR NATURAL LANGUAGE PROCESSING

(71) Applicant: Sony Interactive Entertainment LLC, San Mateo, CA (US)

(72) Inventor: Stephen Yong, San Francisco, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 18 days.

(21) Appl. No.: 17/142,005

(22) Filed: Jan. 5, 2021

(65) Prior Publication Data

US 2021/0201898 A1 Jul. 1, 2021

Related U.S. Application Data

(63) Continuation of application No. 15/682,381, filed on Aug. 21, 2017, now Pat. No. 10,885,901.

(51) Int. Cl.
*G10L 15/30* (2013.01)
*G10L 15/18* (2013.01)
(Continued)

(52) U.S. Cl.
CPC .......... *G10L 15/1815* (2013.01); *G06F 40/35* (2020.01); *G06N 20/00* (2019.01);
(Continued)

(58) Field of Classification Search
CPC ..... G10L 15/1815; G10L 15/22; G10L 15/30; G06N 20/00; G06F 40/35
(Continued)

(56) References Cited

U.S. PATENT DOCUMENTS 10,885,901 B2 1/2021 yong
2013/0073389 A1* 3/2013 Heath .................. G06Q 30/02
705/14.54
(Continued)

FOREIGN PATENT DOCUMENTS

JP 2001-268669 9/2001
JP 2016-534616 11/2016
(Continued)

OTHER PUBLICATIONS

C. Wang et al., "Social Media Intelligence and Learning Environment: an Open Source Framework for Social Media Data Collection, Analysis and Curation," 2019 15th International Conference on eScience (eScience), 2019, pp. 252-261, doi: 10.1109/eScience. 2019.00035. (Year: 2019) (Year: 2019).*
(Continued)

*Primary Examiner* — Bharatkumar S Shah
(74) *Attorney, Agent, or Firm* — Polsinelli LLP

(57) ABSTRACT

Systems and methods of network-based learning models for natural language processing are provided. Information may be stored information in memory regarding user interaction with network content. Further, a digital recording of a vocal utterance made by a user may be captured. The vocal utterance may be interpreted based on the stored user interaction information. An intent of the user may be identified based on the interpretation, and a prediction may be made based on the identified intent. The prediction may further correspond to a selected workflow.

21 Claims, 4 Drawing Sheets

(51) Int. Cl.
  *G10L 15/22* (2006.01)
  *G06N 20/00* (2019.01)
  *G06F 40/35* (2020.01)

(52) U.S. Cl.
  CPC .............. *G10L 15/22* (2013.01); *G10L 15/30* (2013.01); *G10L 2015/223* (2013.01)

(58) Field of Classification Search
  USPC ......................................................... 704/257
  See application file for complete search history.

(56) References Cited

U.S. PATENT DOCUMENTS

| | | | |
|---|---|---|---|
| 2015/0100943 | A1 | 4/2015 | Gabel et al. |
| 2016/0381416 | A1 | 12/2016 | Fan et al. |
| 2017/0140285 | A1 | 5/2017 | Dotan-Cohen et al. |
| 2017/0337261 | A1 | 11/2017 | Wang |
| 2018/0247241 | A1* | 8/2018 | Avrahami ........ G06Q 10/06316 |
| 2018/0253753 | A1* | 9/2018 | Chung ................... G06Q 10/10 |
| 2019/0057686 | A1 | 2/2019 | Yong |

FOREIGN PATENT DOCUMENTS

| | | |
|---|---|---|
| JP | 2020-531895 | 11/2020 |
| KR | 10-2020-0040766 | 4/2020 |
| WO | WO 2019/040197 | 2/2019 |

OTHER PUBLICATIONS

Application No. 2020-508313, Notification of Reason(s) for Refusal dated Apr. 6, 2021.
Chen Yun-Nung et al.; "Detecting actionable items in meetings by convolutional deep structured semantic models", 2015 IEEE Workshop on Automatic Speech Recognition and Understanding (ASRU), IEEE, Dec. 13, 2015. pp. 375-382.
Maira Gatti de Bayser et al.; "A Hybrid Architecture for Multi-Party Conversational Systems", arxiv.org, Cornell University Library, 201 Olin Library Cornell University Ithaca, NY 14853. May 3, 2017. pp. 40.
Moira McGregor et al.; "More to Meetings: Challenges in Using Speech-Based Technology to Support Meetings", Session: Meetings & Collaboration Support, CSCW 2017, Feb. 25-Mar. 1, 2017. pp. 13.
Application No. 18847754.1, Extended European Search Report dated Apr. 16, 2021.
PCT Application No. PCT/US2018/041837 International Preliminary Report on Patentability dated Feb. 25, 2020.
PCT Application No. PCT/US2018/041837 International Search Report and Written Opinion dated Oct. 1, 2018.
U.S. Appl. No. 15/682,381 Final Office Action dated Apr. 17, 2020.
U.S. Appl. No. 15/682,381 Office Action dated Nov. 4, 2019.
U.S. Appl. No. 15/682,381 Final Office Action dated Jun. 17, 2019.
U.S. Appl. No. 15/682,381 Office Action dated Feb. 13, 2019.
Application No. 10-2020-7004408, Second Office Action dated Jan. 17, 2022.
Application No. 10-2020-7004408, Office Action dated Jul. 20, 2021.

* cited by examiner

NETWORK-BASED LEARNING MODELS FOR NATURAL LANGUAGE PROCESSING

CROSS-REFERENCE TO RELATED APPLICATION

This application is a continuation of U.S. patent application Ser. No. 15/682,381 filed Aug. 21, 2017, now U.S. Pat. No. 10,885,901, which is incorporated by reference herein in its entirety.

BACKGROUND

1. Field of the Invention

The present technology pertains to natural language processing, and more specifically to learning models for natural language processing based on network (e.g., game network) interaction.

2. Description of the Related Art

Current content platforms may provide a access to a wide variety of content and options related to such content. As a result, such platforms may be complicated to configure, set up, and navigate. While vocal commands may be used, such vocal commands may likewise require complex or complicated workflows corresponding to the traditional workflow. Players of a game, for example, may use a user device 120 to access the game, which may be hosted on network server 130. The game may be played with other players in the network. For example, player A may wish to play a game with her friends, player B and player C. To execute the same using traditional workflow, the player may need to select the game (e.g., which may include scrolling through a list of players), designating that an invitation be sent to player B (e.g., which may include scrolling through a list of players), and designating that an invitation be sent to player C. Verbally requesting that each step be performed may not necessarily be any more efficient. The use of vocal commands may therefore be as slow as, if not slower than, the traditional workflow.

There is, therefore, a need in the art for systems and methods of network-based learning models for natural language processing.

SUMMARY OF THE PRESENTLY CLAIMED INVENTION

Embodiments of the present invention include systems and methods of network-based learning models for natural language processing. Information may be stored information in memory regarding user interaction with network content. Further, a digital recording of a vocal utterance made by a user may be captured. The vocal utterance may be interpreted based on the stored user interaction information. An intent of the user may be identified based on the interpretation, and a prediction may be made based on the identified intent. The prediction may further correspond to a selected workflow.

Various embodiments may include systems of network-based learning models for natural language processing. Such systems may include an end-user device with a microphone that captures a vocal utterance made by a user and a network server. Such a network server may include a network interface that receives a digital recording of the vocal utterance over a communication network, memory that stores information regarding user interaction with network content, and a processor that executes instructions to interpret the vocal utterance based on the stored user interaction information, to identify an intent of the user based on the interpretation of the vocal utterance, and to make a prediction based on the identified intent, wherein the prediction corresponds to a selected workflow.

Additional embodiments may include methods of network-based learning models for natural language processing. Such methods may include storing information in memory regarding user interaction with network content, capturing a digital recording of vocal utterance made by a user, interpreting the vocal utterance based on the stored user interaction information, identifying an intent of the user based on the interpretation of the vocal utterance, and making a prediction based on the identified intent, wherein the prediction corresponds to a selected workflow.

Further embodiments include non-transitory computer-readable storage media having embodied thereon a program executable by a processor to perform a method of network-based learning models for natural language processing as described above.

BRIEF DESCRIPTION OF THE DRAWINGS

FIG. 4 is an exemplary electronic entertainment system that may be used in.

DETAILED DESCRIPTION

Embodiments of the present invention include systems and methods of network-based learning models for natural language processing. Information may be stored information in memory regarding user interaction with network content. Further, a digital recording of a vocal utterance made by a user may be captured. The words and parts of speech that make up the vocal utterance may be identified based on natural language processing models. Such words may further be interpreted based on contextual information such as the stored user interaction information. An intent of the user may be identified based on the interpretation, and a prediction may be made based on the identified intent. The prediction may further correspond to a selected workflow.

In a content network, some content interaction may further have a social element. Games, for example, may be played with one or more social contacts. During the course of such games, interaction with the other players may involve "trash talk" and other conversations directly or indirectly related to the content.

Figure 1:
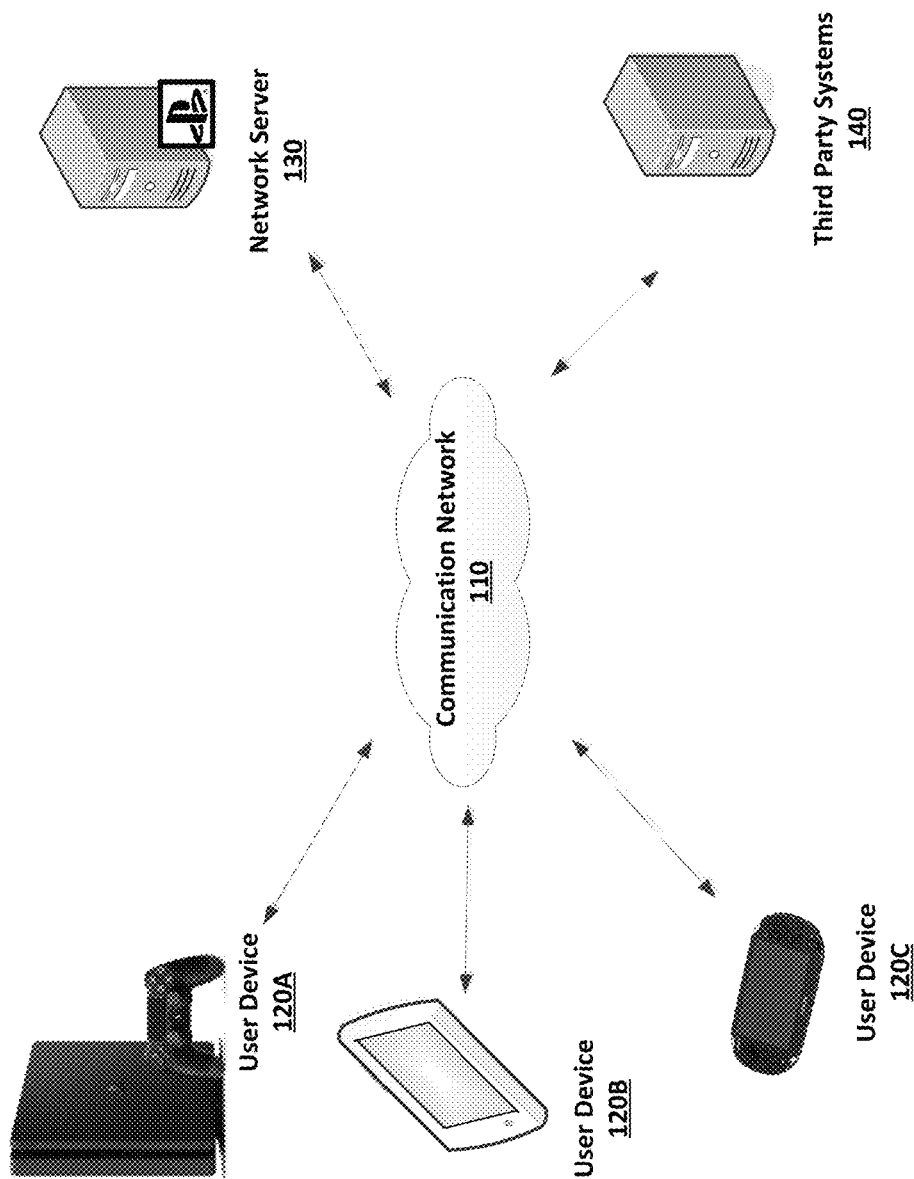
FIG. 1 illustrates a network environment in which a system of network-based learning models for natural language processing may be implemented.

FIG. 1 illustrates a network environment 100 in which a system for social-based management of content may be implemented. The network environment 100 may include a communication network 110 through which one or more client devices 120A-C may communicate with network server 130 and third party systems 140.

Communication network 110 is preferably a local, proprietary network (e.g., an intranet) and/or is alternatively a part of a larger wide-area network (e.g., the cloud). Communications network 110 can be a local area network (LAN), which is communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic computing devices 120A-C, which can include, but is not limited to, general purpose computers, mobile phones, smartphones, personal digital assistants (PDAs), portable computing devices (e.g., laptop, netbook, tablets), desktop computing devices, handheld computing devices, tablet devices, game consoles, smart televisions, or any other type of computing device capable of communicating over communication network 110. Such devices 120A-C are preferably configured to access data from other storage media, such as, but not limited to memory cards or disk drives as may be appropriate in the case of downloaded services. Such devices 120A-C preferably include standard hardware computing components such as, but not limited to network and media interfaces, non-transitory computer-readable storage (memory), and processors for executing instructions that may be stored in memory. An exemplary computing device 120 is further illustrated and described with respect to FIG. 4. In some embodiments, the computing device 120 may be associated with peripheral devices (e.g., microphone on voice switch headset) and software (e.g., messaging applications) by which user input may be captured.

Network server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Network server 130 may host a variety of digital media content available to user devices 120 in the network environment 100. Each user (e.g., of user device 120) may be associated with an account that allows the user to access his or her library of content. Such content may be interactive content that allows for interaction by the user, as well as others. A game, for example, may be played simultaneously by multiple players, as well as involve interaction amongst the players.

Third party systems 140 may provide any of a variety of resources to network server 130 to assist with natural language processing, interpretation, and identification of user intent. Such resources may provide information regarding specific contexts (e.g., in handling requests for games) with which the utterances are related.

Because network server 130 hosts the content, network server 130 may monitor and track a variety of user interaction involving such content. Such interaction may involve network content, as well as interaction with social contacts. Such interaction may include behaviors, communications exchanged, actions taken, events taking place, milestones reached (e.g., points, levels, trophies, achievements, etc.), and other identifiable reactions to the content and/or to the social contacts. In addition, content server 130 may track the details of the content title (e.g., a specific game) with which the user interacts, including genre, developer, play requirements (e.g., number of team members, roles of team members), etc.

Learning models for customized workflows may be developed based on user activity (e.g., content and social interaction) within the network to allow for predictive selection of a workflow. As such, network server 130 may track information regarding user interaction within the network. Such interaction may involve network content, as well as interaction with social contacts. Tracked interaction information may reveal patterns of behavior and trends that may be specific to certain content titles, certain content title genres, certain social circles, and other contexts in which the interaction occurs. The learning models may be developed over time and may rely in part on resources and information provided by third party services 140.

In addition, network server 130 may further store information regarding social contacts with whom the user interacts. Such social contacts, who are also users within the network environment 100, may be designated by the user as such. In some embodiments, the user may further characterize the social contact by degree of familiarity, types of shared activities, types of content in common, common interests, defined teams or clans (which may or may not be specific to a title), or any other category. The social contact may also be associated with a variety of other parameters that may be used to characterize that contact, including demographic data, community membership, respective content titles in his or her library, how often a content title is played, etc.

A microphone associated with user device 120 may capture vocal utterances during the course of such user interaction. Network server 130 may analyze a digital recording of the vocal utterance in context with the current user interaction, as well as past user interactions that may share some commonalities. Such analysis may include decoding the digital recording, transcribing the vocal utterance, evaluating the words of the vocal utterance to identify keywords or other indicators of intent, identifying one or more possible interpretations, and narrowing the possible interpretations based on the context of the user interaction information. Each interpretation may further be associated with a different intent to proceed with a particular workflow. Network server 130 may then make a prediction as to which workflow the user wishes to select based on interpretation of the vocal utterance.

Figure 2:
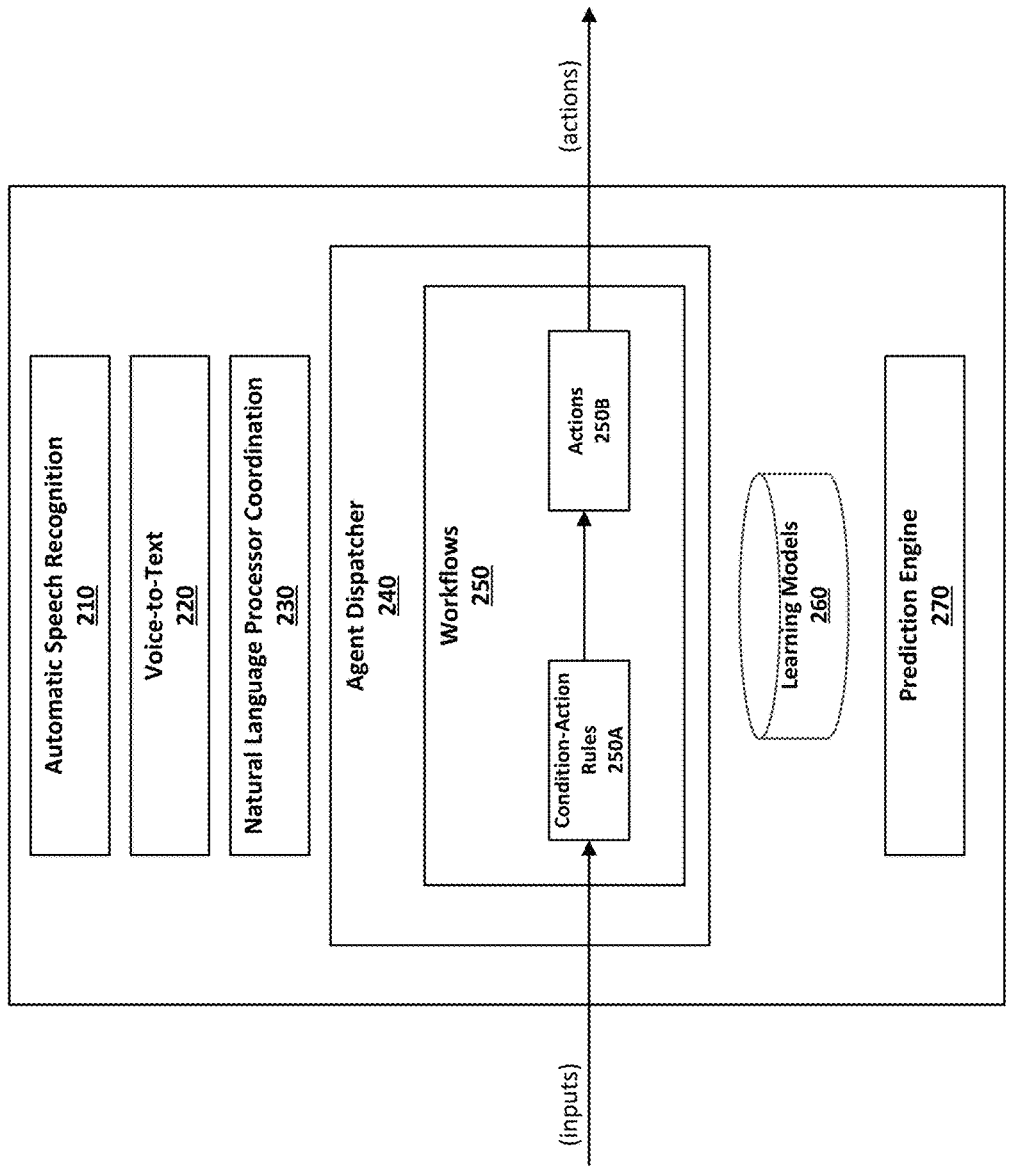
FIG. 2 illustrates an exemplary server that may be used in network-based learning models for natural language processing.

FIG. 2 illustrates an exemplary server 200 that may be used in network-based learning models for natural language processing. While a server 200 may include a variety of standard hardware as described above with respect to network server 130, network-based learning models for natural language processing may further involve more specialized components, such as automatic speech recognition 210, voice-to-text 220, natural language processor coordination 230, agent dispatcher 240 (including condition-action rules 250A and action workflows 250B), learning models 260, and a prediction engine 270.

Automatic speech recognition 210 allows for decoding of digital audio recording, such as a digital recording of a user utterance. Such utterance may be captured as an mp3 file, for example, though any digital audio format (e.g., streamed audio) may be used. Voice-to-text 220 may be inclusive of any transcription application known in the art for analyzing a digital recording, identifying any words spoken, and generating text based on the identified words.

Natural language processor coordination 230 may be inclusive of any processor that can make use of artificial intelligence, filters, classifiers, machine learning techniques, etc. to evaluate an expression of natural language. Such a natural language processor coordination 230—which may be informed by information stored in learning models 260—allows network server 200 to narrow down the possible interpretations of a vocal utterance made by the user and to identify a more specific intent of the user in making that vocal utterance. In some embodiments, natural language processor 230 may weight various factors in identifying which specific intent is meant by the user, including how recently the interaction occurred, how often, with whom (e.g., social contact), characteristics of the content or social content, and identifiable patterns and trends. Natural language processor coordination 230 may further make use of various third party services 140 to assist with interpretation of the words spoken by the user and with identification of intent in different contexts.

Agent dispatcher 240 may manage such third party services 140, specifically identifying which third party services 140 to call on for assistance with a particular task or request. Agent dispatcher 240 may further manage workflows 250 associated with certain condition-action rules 250A and responsive actions 250B to be performed in relation to content interaction. For example, in the context of games, such workflows 250 may relate to various game-related activities (e.g., assembling teams for gameplay). Each workflow 250 may include one or more condition-action rules 250A used to identify which actions 250B (e.g., tasks and steps) are involved in engaging in the activity. Each task and step may require certain information (e.g., inputs) from the user, however. For example, assembling a team may require that the user select one or more team members. Each workflow may include pluggable code used to call on one or more functions and services in a manner customized to the specific user.

As illustrated, various inputs may be received (e.g., from sensors and interfaces detecting conditions in the environment, including user actions) and evaluated in view of condition-action rules 250A. Such evaluation may result in finding that a particular responsive action (e.g., from actions 250B) is to be performed. Information regarding the selected action may then be provided to designated actuators or other actors for execution or performance.

The learning models 260 for interpreting utterances by the user and identifying responsive workflows may be stored and refined over time as data is gathered regarding the user. As such, interpretations of the user utterances may improve with respect to identifying certain entities that the user may be referencing and parts of speech likely to be used by the user. The information used to refine the learning models 260 may include information regarding any variety of user interaction that may occur in the network as tracked by network server 130. Such user interactions may occur in relation to content accessed at network server 130, as well as interactions (e.g., messages sent through messaging applications and otherwise) in relation to social contacts (who also access content at network server 130). The learning models 260 may be continually updated and refined as additional user interactions occur within the network. As such, the base of information to which natural language processor coordination 230 may reference in identifying user intent may continue to grow, allowing for learning and improved recognition of user intent. As such, learning module 260 may be involved in refining the condition-action rules 250A, as well as selection of responsive actions 250B over time in a manner that may be specific to the particular user and their respective habits, networks, and other user-specific characteristics.

Prediction engine 270 may identify that the intent identified by natural language processor coordination 230 corresponds to a predetermined workflow 260. The identified intent may also provide the information needed to execute on a predetermined workflow.

Figure 3:
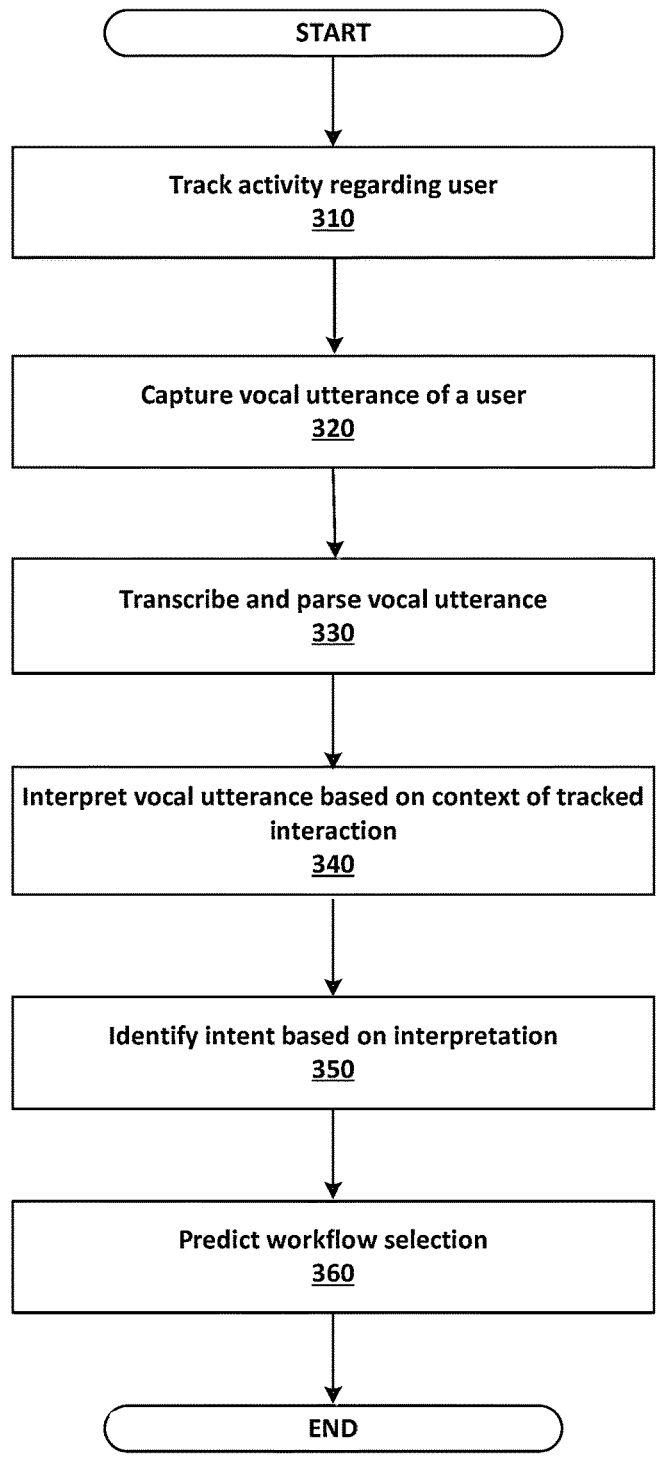
FIG. 3 is a flowchart illustrating an exemplary method of network-based learning models for natural language processing.

FIG. 3 is a flowchart illustrating an exemplary method of network-based learning models for natural language processing. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300, information regarding user interaction may be tracked, a vocal utterance of the user may be captured, transcribed, parsed, and then interpreted in context with tracked interaction, an intent may be identified based on the interpretation, and a workflow selection may be predicted based on the identified intent.

In step 310, information regarding user interaction in a network may be tracked. Such interaction may occur with respect to particular content titles or particular contacts. Information regarding the particular content titles and contacts (e.g., user profiles) may also be tracked, including interaction by each contact with respect to certain content. Such information may be stored in a database, such as learning models 260, as well as in multiple different database accessible to the network server 200.

In step 320, a vocal utterance of the user may be captured. Such capture may occur via microphone at a user device 120. Such vocal utterance may further be saved as a digital recording (e.g., mp3 audio file), which may be transmitted over communication network 110 to network server 130.

In step 330, the vocal utterance may be transcribed and parse. Network server 130 may decode the digital recording (e.g., via decoder 210), as well as transcribe and parse the decoded digital recording (e.g., via speech-to-text 220) into text.

In step 340, the parsed text may be analyzed and interpreted in context of the tracked interaction information from step 310. Natural language processor 230 may identify one or more possible interpretations of the vocal utterance and reference resources from third party services 140 managed by agent dispatcher 240, as well as learning models 260, to narrow down the possibilities.

In step 350, an intent may be identified based on the interpretation. Such an identification may be made by natural language processor coordination 230 based on weighting of various factors, which may include reference to learning models 260, as well as any other databases that may maintain information regarding the users and content in the network. Such weighting may be based on characteristics of the content or social content and may be adjusted over time as additional information is tracked.

In step 360, a prediction may be made as to a workflow selection. Prediction engine 270 may identify that the intent identified by natural language processor coordination 230 in step 350 corresponds to a workflow stored in workflows 260.

Figure 4:
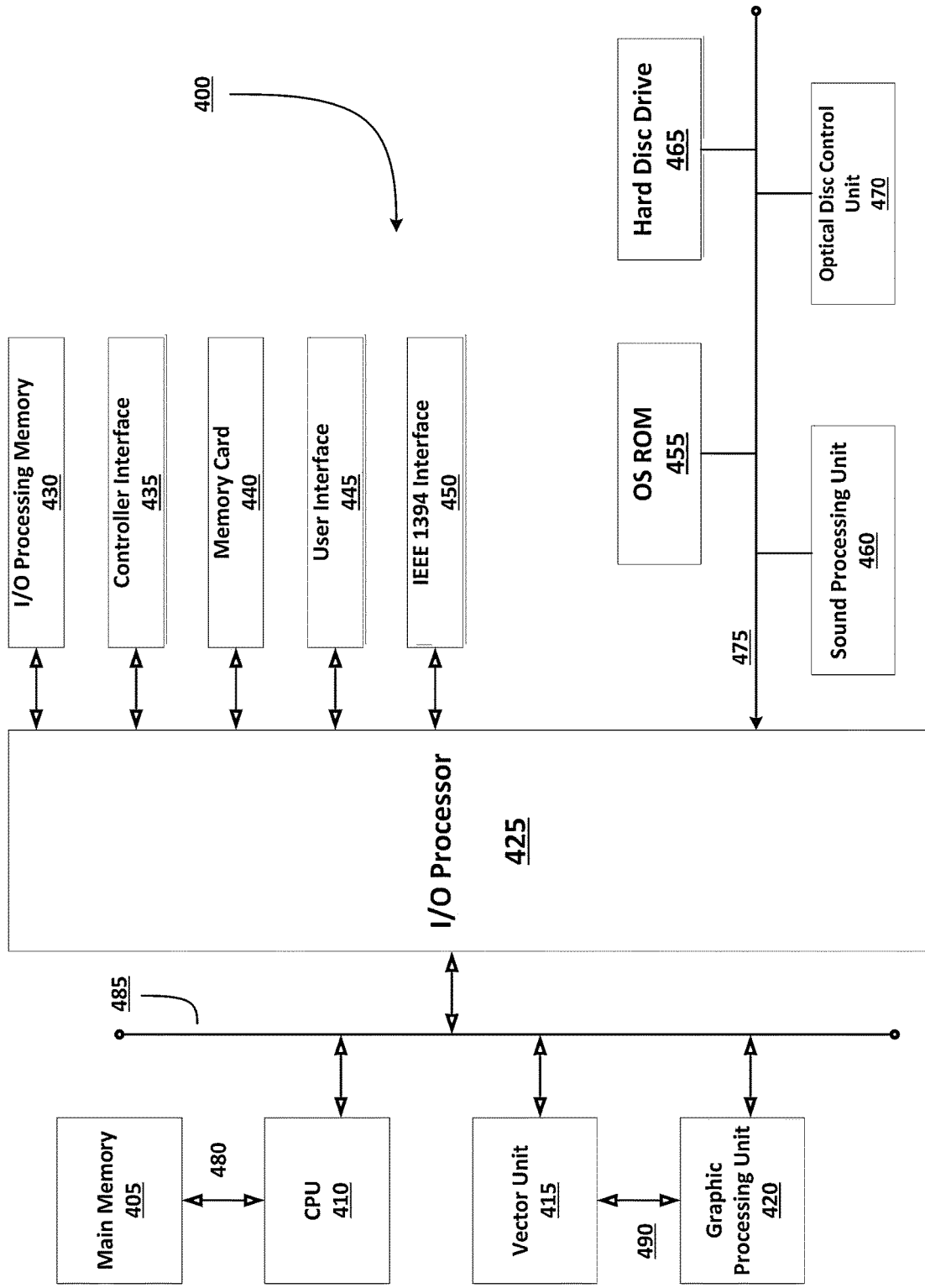

FIG. 4 is an exemplary electronic entertainment system that may be used in real-time incorporation of user-produced media into a broadcast media stream. The entertainment system 400 of FIG. 4 includes a main memory 405, a central processing unit (CPU) 410, vector unit 415, a graphics processing unit 420, an input/output (I/O) processor 425, an I/O processor memory 430, a controller interface 435, a memory card 440, a Universal Serial Bus (USB) interface 445, and an IEEE 1394 interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4$, LTE, 1G, and so forth). The I/O processor 425 of FIG. 4 primarily controls data exchanges between the various devices of the entertainment system 400 including the CPU 410, the vector unit 415, the graphics processing unit 420, and the controller interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the IEEE 1394 interface 450 such as wireless transceivers, which may also be embedded in the system 400 or as a part of some other component such as a processor.

A user of the entertainment system 400 of FIG. 4 provides instructions via the controller interface 435 to the CPU 410. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for customizing social workflows, the method comprising:
    tracking user activity associated with a content title, wherein the tracked user activity includes user interaction with one or more social contacts in an environment of the content title;
    identifying a behavior pattern within the user interaction, wherein the user interaction is associated with one or more conditions corresponding to one or more characteristics of the content title and the social contacts;
    identifying a workflow corresponding to the behavior pattern, the identified workflow including a set of one or more actions taken within the environment of the content title;
    customizing the workflow based on the conditions associated with the user interaction, wherein at least one of the actions in the customized workflow is associated with one or more of the social contacts, and wherein the actions in the customized workflow are associated with different designated actuators; and
    storing the customized workflow in memory, wherein the customized workflow is executed based on detection of one or more of the conditions, and wherein executing the customized workflow includes providing information to the different designated actuators to perform the actions.

2. The method of claim 1, further comprising developing a learning model based on the tracked user activity, and wherein identifying the behavior pattern is based on the learning model.

3. The method of claim 1, wherein the characteristics of the content title includes a genre, and wherein customizing the workflow is based on the behavior pattern being specific to the genre.

4. The method of claim 1, further comprising tracking information regarding the social contacts, the information regarding the social contacts including one or more user profiles of one of the social contacts.

5. The method of claim 1, wherein the tracked user activity includes communication exchanged with the social contacts, and wherein identifying the workflow is based on an identified intent of the communications.

6. The method of claim 5, further comprising identifying the intent by weighting one or more factors associated with the tracked activity; and adjusting the weighting over time based on additional tracked activity.

7. The method of claim 1, wherein the workflow includes defining a team, the characteristics of the content title include a number of team members and one or more team member roles, and wherein customizing the workflow includes selecting the social contacts as team members and assigning roles to the selected team members.

8. The method of claim 1, wherein the customized workflow includes pluggable code executable to call one or more functions and services associated with the at least one action.

9. The method of claim 1, wherein the tracked user activity includes interaction with the social contacts via one or more different applications external to the environment of the content title.

10. The method of claim 1, wherein customizing the workflow is based on a prediction regarding an identified intent of the user, and wherein the prediction includes information needed to execute the workflow.

11. A system for customizing social workflows, the system comprising:
a network server that:
tracks user activity associated with a content title, wherein the tracked user activity includes user interaction with one or more social contacts in an environment of the content title;
identifies a behavior pattern within the user interaction, wherein the user interaction is associated with one or more conditions corresponding to one or more characteristics of the content title and the social contacts;
identifies a workflow corresponding to the behavior pattern, the identified workflow including a set of one or more actions taken within the environment of the content title; and
customizes the workflow based on the conditions associated with the user interaction, wherein at least one of the actions in the customized workflow is associated with one or more of the social contacts, and wherein the actions in the customized workflow are associated with different designated actuators, wherein the customized workflow is executed based on detection of one or more of the conditions, and wherein executing the customized workflow includes providing information to the different designated actuators to perform the actions; and
a memory that stores the customized workflow.

12. The system of claim 11, wherein the network server further develops a learning model based on the tracked user activity, and wherein the behavior pattern is based on the learning model.

13. The system of claim 11, wherein the characteristics of the content title includes a genre, and wherein the customized workflow is based on the behavior pattern being specific to the genre.

14. The system of claim 11, wherein the network server further tracks information regarding the social contacts, the information regarding the social contacts including one or more user profiles of one of the social contacts.

15. The system of claim 11, wherein the tracked user activity includes communication exchanged with the social contacts, and wherein the identified workflow is based on an identified intent of the communications.

16. The system of claim 15, wherein the network server further identifies the intent by weighting one or more factors associated with the tracked activity; and the network server further adjusts the weighting over time based on additional tracked activity.

17. The system of claim 11, wherein the workflow includes defining a team, the characteristics of the content title include a number of team members and one or more team member roles, and wherein the network server customizes the workflow by selecting the social contacts as team members and assigning roles to the selected team members.

18. The system of claim 11, wherein the customized workflow includes pluggable code executable to call one or more functions and services associated with the at least one action.

19. The system of claim 11, wherein the tracked user activity includes interaction with the social contacts via one or more different applications external to the environment of the content title.

20. The system of claim 11, wherein the network server customizes the workflow based on a prediction regarding an identified intent of the user, and wherein the prediction includes information needed to execute the workflow.

21. A non-transitory computer-readable storage medium, having embodied thereon a program executable by a processor to perform a method for customizing social workflows, the method comprising:
tracking user activity associated with a content title, wherein the tracked user activity includes user interaction with one or more social contacts in an environment of the content title;
identifying a behavior pattern within the user interaction, wherein the user interaction is associated with one or more conditions corresponding to one or more characteristics of the content title and the social contacts;
identifying a workflow corresponding to the behavior pattern, the identified workflow including a set of one or more actions taken within the environment of the content title;
customizing the workflow based on the conditions associated with the user interaction, wherein at least one of the actions in the customized workflow is associated with one or more of the social contacts, and wherein the actions in the customized workflow are associated with different designated actuators; and
storing the customized workflow in memory, wherein the customized workflow is executed based on detection of one or more of the conditions, and wherein executing the customized workflow includes providing information to the different designated actuators to perform the actions.

\* \* \* \* \*